Oct. 2, 1923.
L. W. CHASE ET AL
1,469,752
TWO-ROW LISTER
Filed Nov. 5, 1921
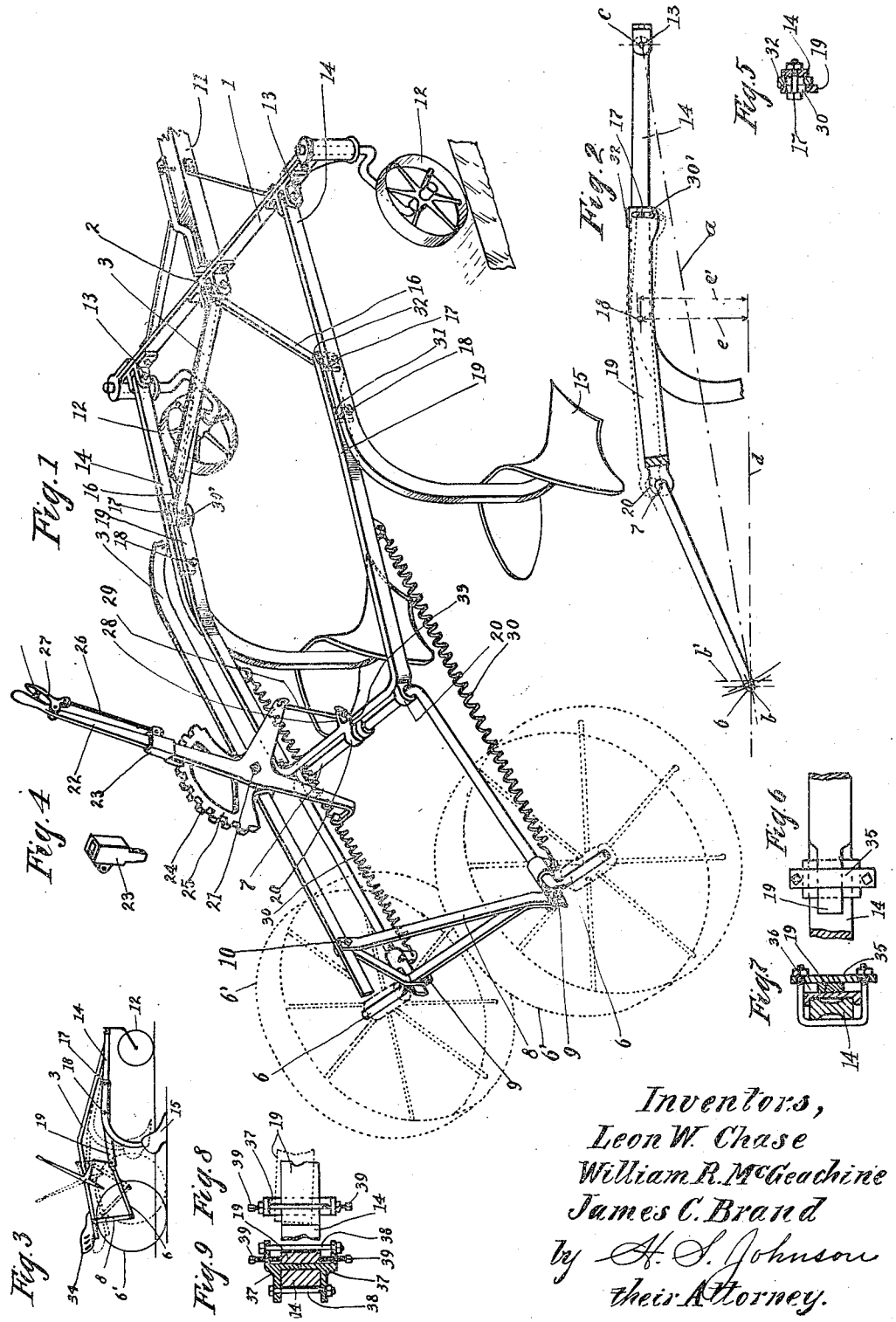
Inventors,
Leon W. Chase
William R. McGeachine
James C. Brand
by H. S. Johnson
their Attorney.

Patented Oct. 2, 1923.

1,469,752

UNITED STATES PATENT OFFICE.

LEON W. CHASE, WILLIAM R. McGEACHIN, AND JAMES C. BRAND, OF LINCOLN, NEBRASKA, ASSIGNORS TO CHASE PLOW COMPANY, OF LINCOLN, NEBRASKA, A CORPORATION OF NEBRASKA.

TWO-ROW LISTER.

Application filed November 5, 1921. Serial No. 513,081.

*To all whom it may concern:*

Be it known that we, LEON W. CHASE, WILLIAM R. McGEACHIN, and JAMES C. BRAND, citizens of the United States, residing at Lincoln, in the county of Lancaster and State of Nebraska, have invented certain new and useful Improvements in Two-Row Listers, of which the following is a specification.

Our invention relates to improvements in agricultural machines, and more particularly to improvements in that class of machines having multiple plows, whereby the plows are mounted so as to be readily shifted from operative to inoperative position, as in multiple bottom listers, plows and the like.

An object of the invention, is the provision of additional means, relative to the usual plow raising and lowering means, whereby a relatively finer or more sensitive individual vertical adjustment for each plow may be had. Ordinarily, agricultural machines of the types referred to in the foregoing, employ mechanism for raising and lowering the plows, which usually involves toothed racks or segments, adapted to be engaged by pawls or dogs in connection with suitable operating lever, whereby the plows may be lowered and held at any one of a plurality of levels, the levels being determined by the pitch of the teeth of said racks or toothed segments.

In practical operation, it has been found very difficult to control multiple bottom listers and plows so that they will run at a uniform depth. Machines of this type have been constructed with a plurality of levers whereby to control variations of depth of the bottoms, but we have found that it is practically impossible to construct these levers so as to obtain sufficiently sensitive adjustment, by means of the ratchet, or, in other words, of the pawl and the rack. We have found, that inaccurate workmanship, in providing the proper suction in the shares of a lister or plow, especially when sharpened by a blacksmith, renders it very difficult to make two bottoms run at the same depth.

A further object of the invention, is to provide simple and efficient means, which will be cheap of manufacture, (inasmuch as it will obviate the necessity of employing special lever mechanism) whereby the vertical position of each plow, relative to the ground, may be separately slightly changed, irrespective of the lever actuated ratchet raising, lowering and locking mechanism, and of the forward pivotal hitch connecting the plow beam to the frame.

To this end the invention consists in the construction, combination and arrangement of parts hereinafter described and claimed.

In the accompanying drawings forming part of this specification;

Figure 1, is a perspective view of a multiple bottom lister, embodying our invention, the seed planting devices and cultivator disks not being shown.

Figure 2, is a fragmentary semi-diagrammatic side view of one of the plow beams, showing its adjustable connection to a structural member of the lister body.

Figure 3, is a semi-diagrammatic side view of Figure 1, drawn to a greatly reduced scale, wherein the dotted lines indicate the positions of the parts, when the plows are in inoperative position.

Figure 4 is a perspective view of the locking dog forming part of the ratchet mechanism.

Figure 5 is a sectional view on a vertical plane passing through bolts 17 in Figure 2.

Figure 6 is a side view of a modified form of the adjusting and clamping means forming part of our invention.

Figure 7 is a vertical sectional view thereof.

Figure 8 is a side view of another modified form of clamping and adjusting means forming part of our invention, and Figure 9 is a vertical sectional view thereof.

Referring to the drawings, Figure 1, represents the skeleton body of a lister embodying our invention, the machine shown consisting of a wheeled frame composed of a cross beam 1, having intermediate its ends, a pivot pin 2, to which is pivotally connected so as to swing vertically, the longitudinally centrally disposed bar 3, said bar being bent upwardly intermediate its ends to form an arch, and extending rearwardly above and beyond the transversely disposed axle 6, which latter is supported by the wheels 6' shown in dotted lines in Figure 1. The axle is constructed in the form of a bail, having a straight cross member 7 disposed in parallelism with the cross beam 1, and with the axis of the wheels, and is swingable vertically to bring its cross member into close proximity to the arch bar 3. The frame further consists of a triangular truss member 8, the ends of the base of the truss having pivotal connections 9, with the axle 6, and the apex of the truss having pivotal connection 10 with the arch bar 3.

The cross beam carries rigidly centrally midway of its ends, a suitable draft tongue 11, and is supported at its ends by the casters 12. Pivotally connected by means of the pivots 13, to the cross beam, so as to align longitudinally with the rear wheels 6' on the axle 6, and arranged parallel to each other, are the plow beams 14, the latter extending rearwardly and preferably in a curve toward the ground, and carrying at their lower extremities the plow shares and mold boards 15. The pivotal connections of the plow beams, and that of the arch bar, are sufficiently loose to permit a substantially universal movement of the beams and bar, thereby rendering the frame flexible, whereby the cross beam is enabled to move in conformity to the irregularities of the ground.

The plow beams are held in parallelism by the brace members 16, the latter being pivoted collectively with the arch bar on the pivot 2. The other ends of the braces are preferably rigidly fastened to the plow beams by means of the clamping or holding bolt 17, though they may be secured in any other suitable manner to hold the plow beams at right angles to the cross beam.

Spaced rearwardly from the clamping bolts 17, and extending laterally through the plow beams, are the pivot bolts 18, which extend through the rearwardly extending arms 19, which may be termed plow beam extensions, the latter being bent inwardly so as to be parallel with the cross member 7, and having loose hinge connection 20 with the latter. The plow beam and its extension constitute a joint beam.

Pivotally mounted on the arch bar as by means of the pivot pin 21, is the upwardly extending bell crank lever 22, the long arm thereof being formed with a suitable handle, and slidably supporting the ratchet dog 23, said dog being adapted to engage the teeth 24, of the toothed segment 25, when slid thereagainst. The dog has rod connection 26, with a spring pressed fulcrumed grip lever 27, whereby the dog is held locked under stress, between the teeth of the segment.

Pivotally connected to the lug 28, which is positioned centrally longitudinally of the machine and extends from one of the beam extensions 19, is the link 29, the outer end thereof being pivotally connected to the short arm of said bell crank lever, whereby, when said lever is actuated, the bail axle and extension beams may be raised at their hingedly connected ends, and so held by the ratchet mechanism, constituted by the segment and dog.

The coil springs 30, extending, under tension, from the bail axle to the plow beam extensions 19, tend constantly to buckle the structure upwardly, so as to form an arch (Figs. 1 and 2) in which position it is normally held by the ratchet locking mechanism when the plows are in operative position. These springs in part serve to counterbalance the weight of the hinged parts of the structure, whereby, when the plows are lowered from inoperative position, shown in dotted lines (Fig. 3) to operative position, the lever 22 will be rendered easier of operation.

Applicants do not claim the structure described in the foregoing, as their invention, with the exception of the pivot and clamping bolts 18 and 17. The preferred form of our invention, consists in providing a curved slot 30, in the end of each of the plow beam extensions 19, said slot being concentric with the pivot bolt 18, and adapted to receive the clamping bolt 17.

Between the plow beams and the extensions, spreader blocks 31 and 32 are provided, the latter being suitably slotted so as to register with the slot 30, so that the bolt 17 may be projected through the plow beam, extension 19, and the brace 16, and the parts thus firmly bolted together.

In Figure 2, the parts are shown in their normal operative locked position, the line $a$ designating the chord of the arc formed by the bail axle, extension 19, and the plow beam, the extremities of the arc being designated by $b$ and $c$, which correspond respectively to the axis of the wheels 6' and the pivot hitch 13 of the plow beam. As $a$ and $b$ are maintained at a constant distance from the ground, an adjustment of the beam extension 19 (Fig. 2) to the position indicated in dotted lines, will move $b$ along the line $d$ to $b'$, and also extend the distance indicated by $e$ to that indicated by $e'$. Thus, the plow share has thereby been raised a distance equaling $e'$ minus $e$.

Obviously, by rotating the extension 19 upon its fulcrum 18, either share or bottom may be adjusted and held locked by the ratchet mechanism at any chosen level, irrespective of the pitch of the rack teeth, thereby enabling an inaccurately sharpened share, to be readily adjusted by means of the clamping bolt in the slot 30 until it runs in unison with the other share.

As the beam extensions 19, loosely contact at 33, and are hinged separately on the member 7, the two plows may be individually adjusted to any desired level, and as the point of attachment of the link 29 is substantially coincident with the longitudinal center of the structure, the parts are suspended in equilibrium, the lifting of the parts causing the rear wheels to be drawn forwardly (Fig. 3) and thereby causing the truss 8 to move on its pivots 9 and 10, carrying the arch bar, with it.

A suitable seat 34 on the arch bar adjacent the lever 22 is provided for the convenience of the operator.

Figures 6 and 7, illustrate a modified form of the clamping means of our invention, wherein the ends of the beam extensions are reduced in width, the reduced portion thereof being clamped against a spreader block by means of a transverse clamping bar 35, and a U bolt extending through said bar, the spreader block being provided to straddle the channel in the sides of some types of plow beams as shown.

The reduced ends may be moved up and down in the spaces 36.

Figures 8 and 9 illustrate another form of the clamping and adjusting means of our invention, wherein we employ oppositely disposed T members 37, the vertical legs thereof extending between the beams and serving as spreaders, said members being clamped on the plow beam by the bolts 38, and being fitted with set screws 39 to engage, respectively the upper and lower edges of the extension beam, so that the screws may be adjusted to change the vertical position of the beam. Thus the beam extension and the plow beam may be jointly termed a vertically bendable beam, and the joint a shiftable lap joint or sliding clamp connection.

We claim:

1. A lister comprising a wheeled frame, laterally spaced plow beams pivoted to the front transverse member thereof for vertical movement and to the side frame members for a similar movement, said side frame members being articulated between the front member and the second pivots of said plow beams, an adjustable connection intermediate the first and second pivots of said plow beams for adjustably fixing said side frame members to the plow beams to prevent pivotal action about said second pivots and to permit independent adjustment of each plow beam relative to its respective side frame members, and means for vertically adjusting the frame.

2. In a lister, the combination, a frame having front and rear wheel supports, said frame including a front cross beam and a rear bail axle, said bail axle being pivotally connected to the frame so as to be bodily movable longitudinally thereof, the bail of said axle extending forwardly and being swingable upwardly, a lever pivoted on the frame and operatively connected to said bail whereby to swing the latter when the lever is actuated, means for locking said lever to hold said bail in upswung position, a pair of laterally alined plow shares positioned between said front and rear wheel supports, and a support for each plow share pivotally connected to said cross beam and to said bail, said support having a vertically bendable joint intermediate its ends and means for arbitrarily rendering said joint rigid.

3. In a lister, the combination, a frame having front and rear wheel supports, said frame including a front cross beam and a rear bail axle, said bail axle being pivotally connected to the frame so as to be bodily movable longitudinally thereof, the bail of said axle extending forwardly and being swingable upwardly, a lever pivoted on the frame and operatively connected to said bail, whereby to swing the latter when the lever is actuated, means for locking said lever to hold said bail in upswung position, a pair of laterally alined plows having forwardly extending beams located between said front and rear wheel supports, the front ends of the beams of said plows being pivotally connected to said cross beam, an arm, one for each plow beam, extending to the bail of said bail axle and having pivotal connection therewith, said bail, in connection with the arm and plow beam of each plow being disposed to form an arch, and an adjustable connection connecting each of said arms to its respective plow beam, whereby the chord of said arch may be changed by adjusting said connection.

In testimony whereof we affix our signatures.

LEON W. CHASE.
WILLIAM R. McGEACHIN.
JAMES C. BRAND.

Witness:
  GEORGE VOELKER.